United States Patent
Monokroussos et al.

(10) Patent No.: US 10,305,423 B2
(45) Date of Patent: May 28, 2019

(54) PHOTOVOLTAIC ELEMENT EVALUATION METHOD, MEASUREMENT SYSTEM CONFIGURATION AND PROCESS FOR USING A MEASUREMENT SYSTEM CONFIGURATION

(75) Inventors: Christos Monokroussos, Thessaloniki (GR); Damien Etienne, Les Hauts-Geneveys (CH)

(73) Assignee: TUV Rheinland (Shanghai) Co., LTD., Shanghai (CN)

( * ) Notice: Subject to any disclaimer, the term of this patent is extended or adjusted under 35 U.S.C. 154(b) by 1199 days.

(21) Appl. No.: 14/401,241

(22) PCT Filed: May 14, 2012

(86) PCT No.: PCT/CN2012/075455
§ 371 (c)(1),
(2), (4) Date: Jan. 7, 2015

(87) PCT Pub. No.: WO2013/170422
PCT Pub. Date: Nov. 21, 2013

(65) Prior Publication Data
US 2015/0127276 A1 May 7, 2015

(51) Int. Cl.
*H02S 50/10* (2014.01)
*H02S 50/15* (2014.01)

(52) U.S. Cl.
CPC .............. *H02S 50/10* (2014.12); *H02S 50/15* (2014.12)

(58) Field of Classification Search
None
See application file for complete search history.

(56) References Cited

U.S. PATENT DOCUMENTS

| | | | |
|---|---|---|---|
| 4,129,823 A | 12/1978 | van der Pool et al. | |
| 2004/0056648 A1* | 3/2004 | Matsuyama | G01R 31/2603 |
| | | | 324/96 |
| 2006/0290344 A1* | 12/2006 | Shimotomai | G01J 1/08 |
| | | | 324/750.02 |

(Continued)

FOREIGN PATENT DOCUMENTS

| | | |
|---|---|---|
| CN | 201203438 | 3/2009 |
| EP | 2296187 A2 | 3/2011 |
| JP | 2005317811 A | 11/2005 |

(Continued)

OTHER PUBLICATIONS

Sinton, R.A., A solution to the problem of accurate flash-testing of high-efficiency modules, 21st European Photovoltaic Solar Energy Conference (2006) 634-638.

*Primary Examiner* — Mohamed Charioui
*Assistant Examiner* — Terence E Stifter, Jr.
(74) *Attorney, Agent, or Firm* — Dinsmore & Shohl LLP

(57) ABSTRACT

The invention is related to a photovoltaic element evaluation method, comprising a time-controlled measurement of a current-voltage characteristic of a photovoltaic element, said photovoltaic element being arranged in a measuring circuit for measuring at least an electrical current and/or an electrical voltage of said current-voltage characteristic.

The invention relates furthermore to a measuring system configuration for performing time-controlled measurements of current-voltage characteristics of replaceable photovoltaic elements.

17 Claims, 8 Drawing Sheets

(56) References Cited

U.S. PATENT DOCUMENTS

2011/0246109 A1    10/2011    Fafard
2011/0316578 A1*   12/2011    Mizutani ................. H02S 50/10
                                                        324/761.01

FOREIGN PATENT DOCUMENTS

| JP | 2006229063 A  | 8/2006 |
| JP | 2011119322 A  | 6/2011 |
| WO | 2010070952 A1 | 6/2010 |
| WO | 211068142     | 6/2011 |
| WO | 2011066554    | 6/2011 |

* cited by examiner

PHOTOVOLTAIC ELEMENT EVALUATION METHOD, MEASUREMENT SYSTEM CONFIGURATION AND PROCESS FOR USING A MEASUREMENT SYSTEM CONFIGURATION

CROSS-REFERENCE TO RELATED APPLICATION

This application claims priority of International Application Number PCT/CN2012/075455 filed May 14, 2012, which is incorporated herein by reference.

BACKGROUND OF THE INVENTION

Field of the Invention

The invention relates to a photovoltaic element evaluation method for performing a time-controlled measurement of a current-voltage characteristic of a photovoltaic element. Furthermore, the invention relates to a measurement system configuration for performing time-controlled measurements of current-voltage characteristics of replaceable photovoltaic elements. Furthermore, for using said measurement system configuration an evaluation process is suggested.

Description of Related Art

A classification and, particularly, a measurement of current-voltage characteristics of photovoltaic elements is commonly performed in pulsable light emitting elements, being used as simulators of solar light emission. This type of measurements and of classification of photovoltaic elements is commonly considered as a backbone of photovoltaic evaluation. Even so, the power measurements of high efficiency photovoltaic elements based on c-Si technology, specifically back-contact or heterojunction techniques, have been a challenge for the photovoltaic research community for at least two decades. For such technologies, testing facilities have reported significantly different nominal power for the same specimens. The deviations observed have been mostly attributed to the internal capacitance of the photovoltaic elements used in the tests. One of the reasons is that the internal capacitance typically is in the range of orders of magnitude higher than that of typical industrial silicon solar cells. The capacitance typically causes hysteresis effects in the response of the photovoltaic elements under varying applied voltage, varying current flow and/or varying light intensity. As a result, current-voltage measurements of high capacitance modules are influenced by sweep-time and sweep-direction effects.

A solution to that problem can be given by performing measurements at solar simulators with very long pulse times (>100 ms). Nonetheless, this is likely to be a very expensive solution, which may also introduce additional problems due to module heating. Several scientists have suggested alternative methods to rate accurately high capacitance modules in pulsed simulators and/or flashed simulators. Most of these methods rely on extending the sweep-time to more than 100 ms by segmenting the current-voltage tracing on a point-by-point or multi-sectional basis. Such methods are effective, albeit time-consuming, since the rundown time between flashes for xenon lamps is significant.

Sinton, R. A. Sinton, 21st EU PVSEC, (2006); pp. 634-638, suggested a method which can minimise the impact of transient errors during multiflash testing. The result was achieved by applying a specific voltage modulation to the terminals of the cell or module under a light pulse of varying intensity. The voltage modulation is synchronised with the light pulse to maintain the stored charge within the test device constant. The operation is performed with simulators with very short pulses and high repetition rates; however it is susceptible to the typical disadvantages of very short pulse multiflash methods.

The foregoing approaches may accurately rate high-efficiency, high capacitance crystalline photovoltaic elements by employing repeating multiple flashes, often up to twenty times, of the test specimens. The final current-voltage dependency is reconstructed by attaching the different subsections together. The method can be realised either in short light pulse (~10 ms), or in high repetition rate—very short light pulse (~2 ms) simulators. Nevertheless, the former are time-consuming, and can cause early aging of the rather expensive xenon bulbs. The later are liable to light uniformity and spectral mismatch issues. Therefore, the described techniques impose severe constrains for module rating in the industry.

The problem to be solved is to provide a solution for accurately measuring the performance, particularly the current-voltage characteristics, of photovoltaic elements, particularly high-efficiency, high-capacitance photovoltaic elements, in standardised form allowing to achieve approximately equivalent results for the same specimen.

SUMMARY OF THE INVENTION

The problem is solved with a photovoltaic element evaluation method including a time-controlled measurement of a current-voltage characteristic of a photovoltaic element. The photovoltaic element is arranged in a measuring circuit for measuring at least an electrical current and/or an electrical voltage of the current-voltage characteristic. The photovoltaic element evaluation method includes the steps of disposing said photovoltaic element to at least one short flash of light having a discrete lighting duration, the short flash of light being generated by a pulsable light emitting element. It further include performing a number of measuring steps during the lighting duration wherein each of the measuring steps includes changing step-wise at least one of the electrical current, the electrical voltage, and an impedance load. The measuring steps also include sampling of at least one value related to at least one of the other of the electrical current, the electrical voltage, and the impedance load.

The problem is also solved with a measurement system for performing time-controlled measurements of current-voltage characteristics of replaceable photovoltaic elements. The measurement system at least includes a connecting system for connecting a photovoltaic element to a measuring circuit of the measurement system. It further includes a pulsable light emitting element, a voltmeter and an ammeter being connected in parallel with each other and with the connecting system. Additionally included is at least one of an electrical current source unit for controlling an electrical current, being connected with the ammeter, an electrical voltage source unit for controlling an electrical voltage, being connected with said voltmeter, and a controllable impedance load unit for controlling an impedance load being connected with at least one of the ammeter and the voltmeter. Moreover, a controlling unit for controlling at least one of said electrical current source unit, the electrical voltage source unit, and said controllable impedance load unit is included. During the measurements, the controlling unit is able to at least initiate a step-wise changing of at least one of the electrical current, the electrical voltage, and the impedance load.

Other advantageous implementations further features and further developments are indicated in the dependent claims as well as in the following description and figures.

Particular features presented as part of a particular embodiment may be deconstructed and be combined with other features of any other embodiment presented. Particularly, further solutions may be generated by exchanging one feature or several features with other features presented. The embodiments described are rather exemplary embodiments and not excluding other embodiments.

BRIEF DESCRIPTION OF THE DRAWINGS

Additional advantages and details of the invention will be explained with reference to embodiments shown in the following drawings. One or more features explained respectively presented in one drawing can be combined with one or more features of another drawing respectively the description above to further embodiments. Embodiments presented here are given as an example but not to restrict the invention.

DETAILED DESCRIPTION OF THE INVENTION

Figure 1:
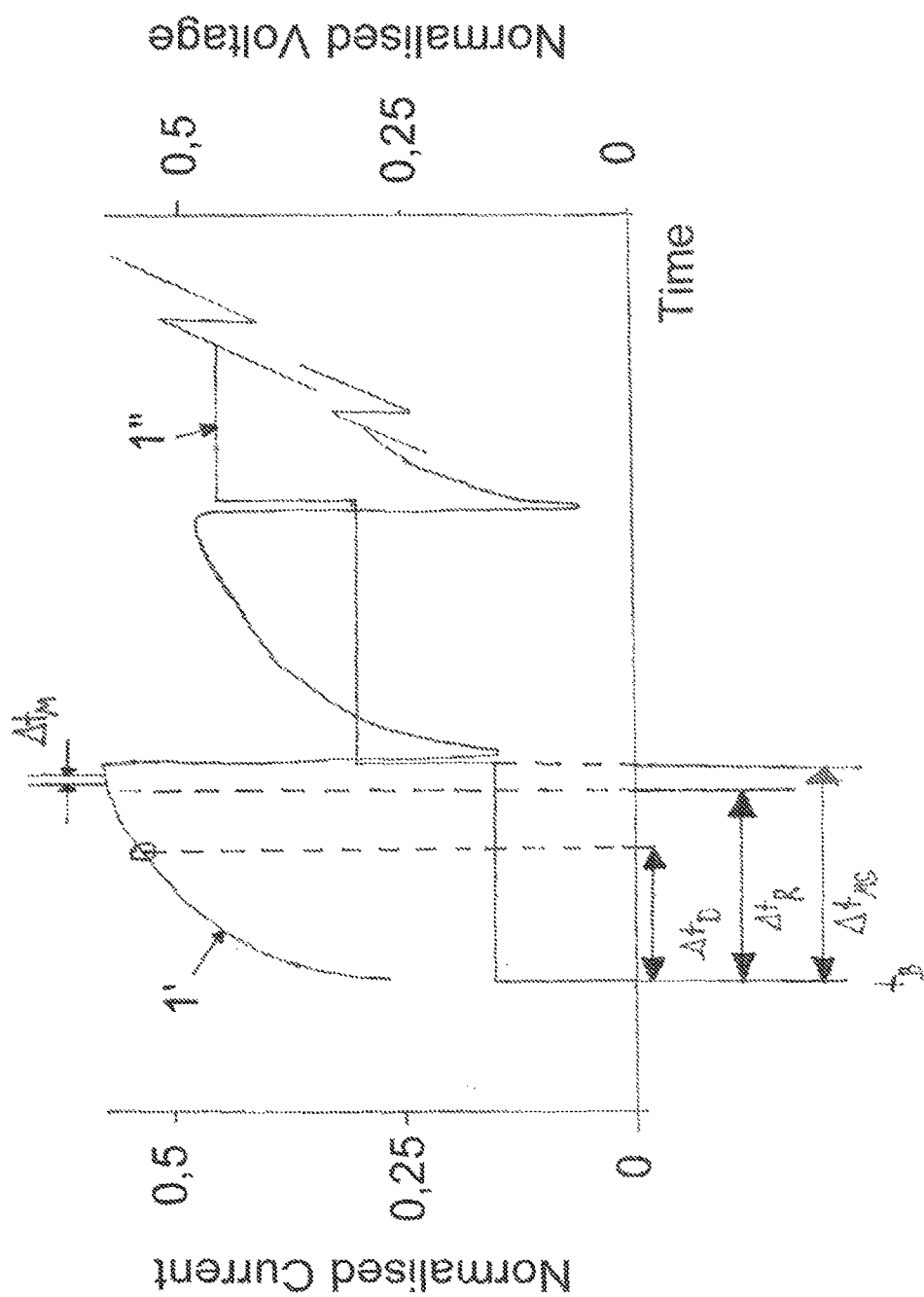
FIG. 1 is an illustration of an idealised representation of measuring steps.

A photovoltaic element evaluation method, comprising a time-controlled measurement of a current-voltage characteristic of a photovoltaic element, is suggested. Said photovoltaic element is arranged in a measuring circuit for measuring at least an electrical current and/or an electrical voltage of said current-voltage characteristic. The photovoltaic element evaluation method further comprises:
  disposing said photovoltaic element to at least one short flash of light having a discrete lighting duration, said short flash of light being generated by a pulsable light emitting element, and
  performing a number of measuring steps during said lighting duration.

Herein, each of said measuring steps comprises:
  changing step-wise at least one of characteristic value said electrical current, said electrical voltage, and an impedance load,
  sampling of at least one responsive value related to at least one of the other of said electrical current, said electrical voltage, and said impedance load.

Said photovoltaic element as mentioned above is an element being able to, at least partially, operate based on the photovoltaic effect. In particular, a photovoltaic element can be embodied as a solar cell or as an assembly of one or several or many solar cells. In the latter embodiment, the photovoltaic element often would be referred to as a solar modul. But also other embodiments, combining any photovoltaic element with any other element, is enclosed by the term photovoltaic element.

Said time-controlled measurement as mentioned above is a measurement during that one or several or many measured values are sampled as a function of at least a time. Here, sampling of a measured value refers to a process of at least comprising measuring a value. Furthermore, sampling may comprise forwarding the value to an output. For example, sampling may comprise to display the measured value on a monitor and/or to save it in a storage, for example in a database. Here, sampling at least a measured value may refer to performing continuous measurement or discontinuous measurements. In case of discontinuous measurements, this might also incorporate a sampling of a measured value to be carried out as a point measurement of only one pair of values.

Said current-voltage characteristic as mentioned above is a relationship between an electrical current and an electrical voltage. In general, a dependence of one of said electrical current and said electrical voltage on the other of said electrical current and said electrical voltage is designated as current-voltage characteristics.

Said measuring circuit as mentioned above is an electrical circuit that is at least suitable to measure electrical characteristics of an element, for instance a current-voltage characteristic. The term electrical circuit comprises any arrangement of measurement units and connections allowing for establishment of electrical current flow. Preferably, electrical ground shall be incorporated.

Said discrete lighting duration means that a lighting duration can be defined within which said flash of light is considerably brighter than before and after said lighting duration. A begin and an end of the lighting duration may be defined according to manifold options. For instance, said begin and/or said end of the lighting duration may be defined as time when a defined threshold value of brightness is exceeded. It could, for instance, be intended that the beginning and/or the ending of the lighting duration is measured by using a reference brightness measuring unit. Furthermore, the light duration might also comprise a definition of simple on/off related to the lighting.

Said sampling can be carried out for a measuring duration as a sampling of values in continuous or quasi-continuous dependence on the time. Furthermore it may be possible that said sampling is carried out as a point-measurement. In addition it may be possible that said sampling may be carried out in a combination of continuous and/or quasi-continuous and/or point-measurement. Instead of a preferable termination of a sampling prior to a respective subsequent step-wise changing it may be possible that sampling will be continued for a time and terminated shortly after a respective subsequent step-wise changing.

Said pulsable light emitting element as mentioned above is a light emitting element that can be used for generation of at least two flashs of light with each of said flash of light having a discrete lighting duration. The term pulsable emitting element here is used in the sense being capable to alternately emit a flash of light of an intensity that is higher than that instantaneously before and after said flash of light. Preferably, a high number of flashes with a potentially broad range discrete lighting durations can be generated. For example, a pulsable light emitting element can be embodied as a unit incorporating electronic flashtubes. Those flashtubes can be, for instance, based on excitation of gas discharges. For instance but typically this gas is a noble gas, in many cases argon, xenon or krypton. In particular, the light emitting element can be embodied as a solar simulator.

The solar simulator may be embodied in form of a flashing simulator. In another embodiment, the solar simulator may be embodied in form of a pulsating simulator. As typical light emitting element, the use of noble gas bulbs, as, for instance, Xenon bulbs, may be envisaged.

It may be applied an irradiance and/or a spectrum of said flash of light to be ideally constant during the lighting duration. In another embodiment, it can be envisaged said irradiance and/or said spectrum to be regulated to minimise any variation of irradiance and/or spectrum during the measurement time. In another embodiment, it can be envisaged said irradiance and/or said spectrum to be regulated to minimise any variation of irradiance and/or spectrum during the duration of a measurement step. In another embodiment, it can be envisaged said irradiance and/or said spectrum to be regulated to minimise any variation of irradiance and/or spectrum during the lighting duration.

It is intended that a number of measuring steps is performed during said lighting duration. In particular, this means that during at least one lighting duration a number of at least two measuring steps takes place. It can also be intended that more than two or that all measuring steps take place during one lighting duration, i. e. in a time duration of said lighting duration or in less of a time duration of said lighting duration.

It is intended that sampling at least one value related to at least one of the other of said step-wise changed said electrical current, said electrical voltage and said impedance load occurs. This may comprise measuring of at least one value related to one of an electrical current, an electrical voltage and an impedance load. For instance, it may be intended the measuring to take place continuously or quasi-continuously, or in discrete intervals. Furthermore, it may be intended that eventual discrete intervals are spreaded equidistantly or with varying distances. Furthermore, the sampling can be carried out such that only one measurement at one point of an event is carried out. Measuring at one point of an event might include measuring in a time-scale in the order of magnitude of the time resolution of a measuring device actually used.

However, the term of a value being related to at least one of said electrical current and said electrical voltage refers to the fact that it is not necessarily mandatory a direct measurement of an electrical current and/or an electrical voltage to be carried out. However, an indirect measurement can be applied. It is possible to measure a parameter form which the value can be deduced.

Said changing of at least one of said electrical current and said electrical voltage may be carried out by actively changing at least one of said electrical current and said electrical voltage. For example, at least one of said electrical current and said electrical voltage can be actively, e.g. closed-loop or open-loop, controlled by respective controlling means.

With reference to the changing being carried out step-wise it is referred to a change of value quite abruptly, i.e. in an idealised case such that the change might be depicted as a step function in dependence on time. However, with the changing being carried out in a step-wise manner it shall be included to change the respective value in a very short time-scale. Consequently a changing of the at least one of said electrical current and said electrical value such that a graph representing the changing deviates slightly from a step function shall also be possible and included in the invention.

In another embodiment, it may be intended that at least one of said electrical current and said electrical voltage being indirectly, open-loop or closed-loop, controlled by controlling an impedance load of at least one part of said measuring circuit. For example, it may be intended that said impedance is an impedance across at least said photovoltaic element.

Said sampling may be intended to refer to a process of storing a certain value of at least one of the other of said electrical current, said electrical voltage, and said impedance load. Said sampling is intended to refer to measured and/or sampled values of said electrical current, said electrical voltage and/or said impedance load being associated to at least one of said electrical current, said electrical voltage and said impedance load after changing. Continuous and/or discontinuous measuring of one or more values may also being comprised. Furthermore, it may be possible to perform one or more of the measurements as a point measurement, i.e. only one pair of values are measured and/or sampled.

It is additionally possible that said sampling is carried out as a sampling of at least one value related to at least one of the other of said step-wise changed electrical current, electrical voltage, and impedance load in such a way that a value related to at least one of the other of said step-wise changed electrical current, electrical voltage, and impedance load might, e.g., include a derivative or other values which may be indirectly related to said measurands.

In a further embodiment, it is intended that a reaction time for said value for increasing or decreasing during one measurement step is as long or longer as a determinable time duration for said measurement step.

Said reaction time is intended to denote a time duration at that and/or after that said sampling of at least one value related to at least one of the other of said electrical current, said electrical voltage, and said impedance load is carried out. However, this does not exclude any other values to be measured and/or sampled prior to said reaction time. The term reaction time refers to the fact that, after changing step-wise at least one of said electrical current and said electrical voltage, other values being possible measurands may need some time to react and to shift towards a new steady-state or at least a new defined state.

The determinable time duration is a time duration that is determinable from certain given conditions. It comprises any method of determining a determinable time that is not mainly determined by any arbitrary determination.

However, it may in some cases be possible to comprise arbitrary elements to the determination of a determinable time duration as long as they are combined with a determination being carried out from certain given conditions. For example for one embodiment it may be possible to a preliminary determinable time duration is modified, for example by subtraction, multiplication and/or by addition of time constants as well as factors being dependent on other measurands.

The determinable time duration may be open-loop controlled or closed-loop controlled. In a preferred embodiment said sampling is carried out after a minimum time duration. Said minimum time duration being preferably the determinable time duration. Said minimum time duration may be embodied as a time duration after that at least a certain condition is expected to be at least fulfilled. In another embodiment the minimum time duration may be embodied as a time duration after that at least a certain condition is demonstrated to be at least fulfilled.

In cases continuous or quasi-continuous sampling of values in dependence on time is carried out the method might be referred to as static photovoltaic element evaluation method. In cases a point measurement or point measurements are carried out and a reaction time is as long or longer as a determinable time duration, the method might be referred to as dynamic photovoltaic element evaluation method.

In one embodiment, it is intended that said sampling is carried out after lapse of said reaction time. In another embodiment, it is intended that sampling of only one single value is carried out after lapse of said reaction time.

Furthermore, according to another embodiment said reaction time is at least close to, preferably identical to said determinable time duration.

An advantage of said reaction time being close to said determinable time duration is that a time duration being necessary for a measuring step is reduced. By further approaching said reaction time to said determinable time duration it is hence possible to further reduce a time duration necessary for a measuring step. In case of carrying out approaching said reaction time to said determinable time duration for several or many or, most preferably, every measuring step of said time-controlled measurement, a total duration of one of said time-controlled measurements can be further minimised.

In another embodiment, it may be envisaged that during each measuring step only one single of said sampling is carried out at the time when said determinable time duration just is lapsed.

According to a further improvement the method additionally comprises:
  sampling both said electrical current and said electrical voltage at least nearby an end of said determinable time duration,
  beginning of a next measuring step at least shortly after said sampling of both said electrical current and said electrical voltage unless an intended maximum value of at least one of said electrical current and said electrical voltage is reached.

An advantage of this embodiment is that with sampling both, said electrical current and said electrical voltage, pairs of values of easily measurable measurands are sampled. By sampling said pairs of values at least nearby to an end of said determinable time duration, sufficient values might be gained for further evaluation of the behaviour of said solar element, respectively solar panel.

Preferable, the method comprises sampling of both, said electrical current and said electrical voltage, at least nearby to an end of said determinable time duration, which results for example in sampling of values by requiring only a time duration close to a minimum time duration. By that the time duration finally required is at least close to be minimised to its minimum possible value, based on the determination measuring for a time duration of each step.

A further embodiment of the method comprises that a time duration finally necessary for performing said time controlled-measurements is reduced and preferably minimised by beginning a respective next measurement step at least shortly after said sampling of both said electrical current and electrical voltage, preferably directly with said sampling. The term of beginning of a next measuring step at least shortly after said sampling is to be understood such that said beginning of a respective next measuring step is carried out immediately after said sampling the very earliest.

It may additionally be possible that said determinable time duration is adjusted in dependence on a specific condition of a steady-state value of said at least one value, preferably said electrical current and/or said electrical voltage. For example a measurement point is achieved when the steady-state value is achieved at least to a certain extent.

An advantage of this embodiment of said method is that, e.g. prior to carrying out a measurement and/or a measuring step, a degree of extent can be stipulated by which a steady-state value of a measurand is achieved. For example, it can be envisaged that said electrical current is step-wise changed and said determinable time duration is adjusted in dependence on a condition of a steady-state value of said electrical voltage to be achieved at least to a certain extent, for example 80% of its final steady-state value. According to another example, it can be envisaged that said electrical voltage is step-wise changed and said determinable time duration is adjusted in dependence on a condition of a steady-state value of said electrical current to be achieved at least to a certain extent, for example 80% of its final steady-state value.

It is preferred that said determinable time duration is determined in dependence on a saturation behaviour of said photovoltaic element. Herein it is suggested that said photovoltaic element is considered as being a model of a capacitive element.

An advantage of determining said determinable time duration under consideration of said photovoltaic element as a capacitive element is that knowledge on saturation behaviour of capacitive elements, for instance, a capacitor or combinations of capacitors, can be used to determine the saturation behaviour of said photovoltaic element.

It is furthermore possible that said determinable time duration is determined by using a capacitance charging model, wherein a time-dependent change of at least one of said electrical current and electrical voltage is extrapolated by fitting said capacitance charging model.

For a development of a appropriate capacitance charging model, one or more of the considerations explained above and below may be taken and/or combined with each other and/or with additional modelling.

According to one embodiment the electrical current deviation and/or electrical voltage deviation over a certain measuring time duration is sufficiently small and in the range of a repeatability of the measurement setup.

Furthermore, an embodiment of the method additionally comprises determining said determinable time duration, preferably said minimum time duration, by using a respective relative capacitance change. The respective relative capacitance change is for example evaluated at least both at a current measuring step and at a preceding measuring step. In a particular embodiment the relative capacitance change may be corresponding to a steady-state current-voltage condition. In another embodiment, the respective relative capacitance change is evaluated at least both at a respective current measuring step and at a respective last preceding measuring step.

The capacitance can be measured with techniques, as by using a RC time constant, a phase of a periodic signal, a frequency modulation and/or an amplitude modulation. For measuring, for example a capacitance meter may be used.

Furthermore, it may be envisaged to use a capacitance charging model. This model might comprise fitting said capacitance charging model to measured values of electrical current and/or electrical voltage. This method is based on the fact that charging and discharging of a capacitor is related quasi in exponential relationship to the reciprocal value of the time constant and the negative of the reciprocal value of the time constant, respectively. By additionally considering that the given measuring circuit does not constitute and/or comprise an ideal capacitor, modified formulae may be used for development of said capacitance fitting model. It is for example possible to by multiply of the time constant by a factor, which may be constant or depending on other values as, for example an electrical current, an electrical voltage, a time, and/or a capacitance change. Furthermore, it is emphasised that given capacitance model may already be used in case of issuing reasonable anticipations of the measurable values which partially may deviate by more than some 10% from the measured values.

It can additionally be envisaged that determining of said determinable time duration, preferably said minimum time duration, is carried out by using $$\frac{t(I_{i,meas}, V_{i,meas})}{T} \propto \frac{|C(I_{i,SS}, V_{i,SS}) - C(I_{i-1,SS}, V_{i-1,SS})|}{\sum_{i=1}^{N} |C(I_{i,SS}, V_{i,SS}) - C(I_{i-1,SS}, V_{i-1,SS})|} + c \quad (1)$$

or a modification of this formula.

In this equation, $t(I_{i,meas}, V_{i,meas})$ is a value being used as minimum time duration that is preferably to be lapsed after a changing of said at least one of an electrical current and an electrical voltage. In this equation, $(I_{i,meas}, V_{i,meas})$ is a measured pair of current-voltage for an $i^{th}$ datapoint of a current-voltage characteristics consisting of N points. $C(I_{i,SS}, V_{i,SS})$ is the relative capacitance corresponding to steady-state current-voltage conditions $(I_{i,SS}, V_{i,SS})$. $C(I_{i-1,SS}, V_{i,SS})$ is the relative capacitance corresponding to the steady-state current-voltage conditions of its previous $(i-1)^{th}$ datapoint. For the special case of i=1, the relative capacitance $C(I_{i-1,SS}, V_{i,SS})$ corresponds to a bias condition of the photovoltaic element. The constant, c, is related to a delay introduced by the load regulation and, e.g., an empirical factor. The number of points N measured within the time frame T is chosen suitably, so any pair $(I_{i,meas}, V_{i,meas})$ of the measured current-voltage of the current-voltage curve would be reproducible of its steady-state values $(I_{i,SS}, V_{i,SS})$ and shall not show significant signs of transient errors.

In dependence on the measuring setup used, it may be envisaged to employ modified versions of the above equation being, e.g.

$$\frac{t(I_{i,meas}, V_{i,meas})}{T} \propto \left[\frac{|C(I_{i,SS}, V_{i,SS}) - C(I_{i-1,SS}, V_{i-1,SS})|}{\sum_{i=1}^{N} |C(I_{i,SS}, V_{i,SS}) - C(I_{i-1,SS}, V_{i-1,SS})|} + c\right]^{\alpha},$$

or $$\frac{t(I_{i,meas}, V_{i,meas})}{T} \propto \left[\frac{|C(I_{i,SS}, V_{i,SS}) - C(I_{i-1,SS}, V_{i-1,SS})|}{\sum_{i=1}^{N} |C(I_{i,SS}, V_{i,SS}) - C(I_{i-1,SS}, V_{i-1,SS})|}\right]^{\beta} + c$$

or $$\frac{t(I_{i,meas}, V_{i,meas})}{T} \propto \frac{|C(I_{i,SS}, V_{i,SS}) - C(I_{i-1,SS}, V_{i-1,SS})|^{\gamma}}{\sum_{i=1}^{N} |C(I_{i,SS}, V_{i,SS}) - C(I_{i-1,SS}, V_{i-1,SS})|} + c$$

or $$\frac{t(I_{i,meas}, V_{i,meas})}{T} \propto \left[\frac{|C(I_{i,SS}, V_{i,SS}) - C(I_{i-1,SS}, V_{i-1,SS})|}{\sum_{i=1}^{N} |C(I_{i,SS}, V_{i,SS}) - C(I_{i-1,SS}, V_{i-1,SS})|}\right]^{\delta} +$$

$$\left[\frac{|C(I_{i,SS}, V_{i,SS}) - C(I_{i-1,SS}, V_{i-1,SS})|}{\sum_{i=1}^{N} |C(I_{i,SS}, V_{i,SS}) - C(I_{i-1,SS}, V_{i-1,SS})|}\right]^{\varepsilon} + c$$

with $\alpha$, $\beta$, $\gamma$, $\delta$, $\varepsilon$, $\chi$ being, e.g. empirical, factors. The factors may be constant or dependent on electrical current, electrical voltage, capacitance, and/or time. Furthermore an exponential or an logarithmic relationship with the respective right-hand sides of any of the above formulas may be considered.

Furthermore, it may be possible that the right-hand side of any of the above formulas is amended by a further summand, where the summand is a constant.

Preferably closed-loop controlling of said determinable time duration, preferably is comprised by at least:
  determining a time derivative of said electrical current and/or said electrical voltage, and
  checking for matching of said time derivative with a setpoint value.

This can also be included additionally in such a method as suggested.

As an example for determining the time derivative, the time derivative may, for instance, be determined by a linear determination approach by setting a condition of said electrical current and/or said electrical voltage deviation not exceeding a certain value. Preferably this value for deviation is in the range of 0.01%-1%, related to a determinable time duration. The determinable time duration may be predetermined to account for, for example 5 μs. Furthermore, said determinable time duration may be adjusted, automatically or manually, in dependence on the measurement setup.

It is furthermore suggested closed-loop controlling of said determinable time duration additionally comprises adjusting said determinable time duration to have a determined relation to a time when matching of said time derivative with a setpoint value occurs. As an example, said determinable time duration may be determined as the exact time when said matching of said time derivative with a setpoint value occurs.

Furthermore it is suggested, that additionally, preferably iteratively and ex-situ and/or in-situ, the value of said changing of at least one of said electrical current, said electrical voltage, and said impedance load is adjusted by using
  an estimated dependence of a time duration, preferably of said determinable time duration, on said electrical current, said electrical voltage, and/or said impedance load, preferably with
  the additional use of a condition of transient errors to remain negligible.

In this context, the term of said transient error refers to measurement artifacts introduced in the current-voltage measurement because of particular properties of a given device. Preferably, said transient error refers to the capacitive behavior of the device. Such errors are dependent on the test specimen, here the photovoltaic element, but also on the measurement system, for example the solar simulator. The magnitude of the error in many cases may vary from +30% to −30% of the actual value. According to IEC 60904-1, the following has to be taken into account: "The time interval between data points shall be sufficiently long to ensure that the response time of the test specimen and the rate of the data collection will not introduce transient errors." The term "sufficiently long" refers to the required time. The standard is vague. There is no specific value given. Nevertheless, it is suggested to allow to neglect transient errors in the range of up to ±0.5% or less depending on the measurement repeatability limit.

Furthermore, the method may include carrying out said changing of at least one of said electrical current, said electrical voltage, and said impedance load in equidistant steps during at least a part of said measurement.

Furthermore, it is suggested that the method further comprises carrying out said number of measuring steps, completely or partially, within one single of said lighting duration. An advantage of carrying out said number of measuring steps within one single of said lighting duration is that irradiance level during a particular measurement can be ensured to remain constant.

Both the number of steps and/or the distance between two subsequent measuring steps may be determined ex-situ or in-situ. An in-situ determination may optimise the number of steps by including additional steps or by reducing the number of steps, e.g. from a predefined computed mesh of parameters of measuring steps, wherein for a determination of a predefined computed mash, e.g., equation (1) or a modification of said equation, as for example any of the modifications shown above or other modifications, may be used with further the available measurement time as a given parameter.

Another aspect of the invention relates to a measurement system configuration for performing time-controlled measurements of current-voltage characteristics of replaceable photovoltaic elements. Said measurement system configuration at least comprises:

a connecting system for connecting a photovoltaic element to a measuring circuit of said measurement system configuration, a pulsable light emitting element, a voltmeter and an ammeter being connected in parallel with each other, preferably additionally connected in parallel with said connecting system, at least one of an electrical current source unit for controlling an electrical current, being connected with said ammeter, an electrical voltage source unit for controlling an electrical voltage, being connected with said voltmeter, and a controllable impedance load unit for controlling an impedance load being connected at least one of with said ammeter and said voltmeter, a controlling unit for controlling at least one of said electrical current source unit, said electrical voltage source unit, and said controllable impedance load unit. Here, during said measurements the controlling unit is able to at least initiate a step-wise changing of at least one of said electrical current, said electrical voltage, and said impedance load.

According to one embodiment said electrical current source unit is connected in series with said ammeter. Said electrical voltage source unit connected in parallel with said voltmeter. Said controllable impedance load unit may be in series with said ammeter and/or in parallel with said voltmeter.

Furthermore, the measuring unit comprises at least one regulating unit. For example, it may be possible, that a first regulating unit for regulation of said electrical current is connected in series with both, said controlling unit and said electrical current source unit. In one embodiment, it is referred that an output of said first regulating unit is connected with an input of said electrical current source unit. In a further embodiment an output of said electrical current source unit is connected with an input of said regulating unit. By that said electrical current source unit might become a controlled electrical current source unit.

Furthermore, it is possible that the voltmeter and the ammeter are comprised in a same housing and are embodied as a current-voltage measuring device.

The ability of said controlling unit to be able to at least initiate a step-wise changing of at least one of said electrical current, said electrical voltage, and said impedance load refers to a specific arrangement causing said controlling unit to exhibit said ability. E.g. an integrated circuit may be connected with the controlling unit with programming means being designed for resulting in said ability. Other embodiments are furthermore possible as long as a storage element for storing said program and a processing unit for processing said program are arranged in interaction with said controlling unit.

In another example a second regulating unit for regulation of said electrical voltage is connected in series with both said controlling unit and said electrical voltage source unit. In a further embodiment, an output of said second regulating unit is connected with an input of said electrical voltage source unit. Additionally an output of said electrical voltage source unit might be connected with an input of said regulating unit. Thereby, it is possible that said electrical voltage source unit becomes a controlled electrical voltage source unit.

Furthermore, it is preferred that said controlling unit comprises an initiator for said changing of at least one of said electrical current, said electrical voltage, and said impedance load in case that a steady-state value of said electrical current and/or said electrical voltage is achieved at least to a certain extent.

Preferably said controlling unit comprises an initiator for said changing of at least one of said electrical current, said electrical voltage, and said impedance load in case that at least matching of a time derivative of said electrical current and/or said electrical voltage with respective setpoint values is determined by the controlling unit. This may also include changing said electrical current, said electrical voltage, and said impedance load the setpoint value is not exactly matching but is crossed in a time behaviour of said electrical current, said electrical voltage, and said impedance.

Furthermore, it might be possible that said controlling unit comprises an initiator for said changing of at least one of said electrical current, said electrical voltage, and said impedance load at times and/or by values of said step-wise changing determined by using respective relative steady-state capacitance changes between respective two subsequent measuring steps.

Additionally, it is possible that said controlling unit operates either in an active configuration regulating said electrical voltage or in a passive configuration controlling said impedance across the measured photovoltaic element.

It is further suggested that said controlling unit is connected with a processing unit, said processing unit calculating times and/or values of said step-wise changing by in-situ using values measured by said voltmeter and/or said ammeter.

Furthermore, it is suggested that said controlling unit is connected with a memory unit being filled with predetermined values of times and/or values of said step-wise changing.

Moreover, said measurement system configuration preferably comprises an independent measuring circuit for carrying out reference measurements. Said independent measuring circuit is here envisaged to at least comprises:

A photovoltaic reference element being disposed in a comparable arrangement with said pulsable light emitting element as the photovoltaic element, and a further ammeter and/or a further voltmeter.

In the above examples it may be possible that said controlling unit to be connected with a processing unit is embodied as said controlling unit to comprise said processing unit, i.e. they may be embodied as one assembly.

The independent measuring circuit preferably is used to control the level of irradiance to be held constant during one or more measuring steps. Furthermore, the independent measuring circuit may be used to calibrate the light intensity to a desired value, i.e. the STC irradiance. This STC irradiance has for example a value of 1000 W/m2 according to STC.

STC is the Standard Test Conditions based on which solar modules are tested, comprising a temperature of 25° C. for the module, a spectre of the light as defined in IEC 904-3 (1989) part III with an air mass AM of 1.5.

Another aspect of the invention relates to a measurement system configuration with the connecting system being designed for connection of standardised photovoltaic elements for performance of high throughput photovoltaic element evaluation.

An advantage of such a measurement system configuration with the connecting system designed for connection of standardised photovoltaic elements is, that the invention can be used with standard photovoltaic elements, as, for instance, standard solar cells.

A further aspect of the invention relates to a process of using a measurement system configuration arrangement, especially as described above and in the following for performing a photovoltaic element evaluation method, preferably as suggested here, for a purpose of product classification of photovoltaic elements.

It should be noted that the invention is not limited to the combination of features shown in the figures. Instead, the features disclosed in the description, including the description of the features, can be combined with those features specified in the figures. In addition it should be noted that the reference symbols listed in the claims should in no way limit the scope of protection of the present invention, but instead refer merely to the embodiments shown in the figures.

Figure 2:
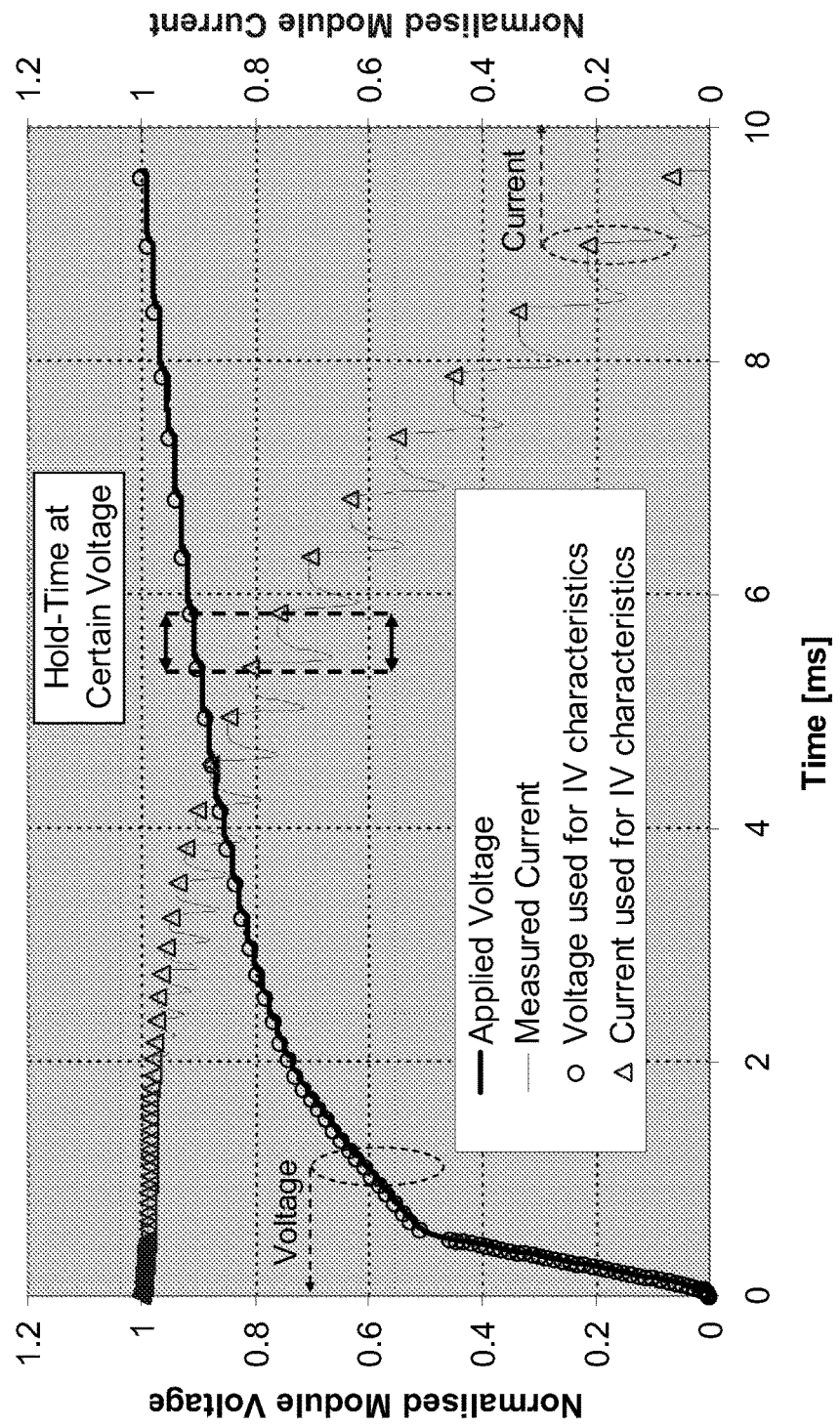
FIG. 2 is an illustration of a normalised electrical current and normalised electrical voltage of a photovoltaic element in dependence on time.

In FIG. 1 an idealised representation of measuring steps is shown as it is exemplary, e.g. for a measurement as is shown in FIG. 2. For explanation of exemplary presentation of embodiments of measuring setups it is referred to the latter. In the representation shown, an electrical voltage is changed step-wise as an example of a step-wise changing as described above. The electrical voltage as a function of time is depicted by function 1". A first step-wise changing of the voltage is carried out at a time $t_B$. As a reaction to the step-wise changed voltage, a time-dependent changing of an electrical current can be observed. The electrical current as a function of time is depicted by function 1'. A time duration $\Delta t_{MS}$ is the duration of the particular measurement step which, in the representation shown, ends with a further step-wise changed of the electrical voltage. The term $\Delta t_R$ depicts an embodiment of a reaction time. The reaction time is a time one waits a dependent measurand, in the given case the electrical current, to react following to the step-wise changing of the step-wise changed value, in the given case the electrical voltage. An embodiment of said determinable time duration is depicted as $\Delta t_D$. As explained above, the determinable time duration is a time duration which is characterised in that the reaction time is as long or longer as a determinable time duration. Furthermore, said sampling is carried out at and/or after the reaction time. Furthermore, in the embodiment shown a measuring duration $\Delta t_M$ is shown as a time duration during that sampling of, in the example shown, the normalised current is carried out. In cases $\Delta t_M$ is reduced to an infinitesimally short measuring duration the measurement shown would become or be similar to a point measurement.

In FIG. 2 results of an embodiment of the photovoltaic element 1 evaluation method are presented. The method has been carried out using an exemplary implementation of the photovoltaic element 1 evaluation method mentioned below, similar to that shown in FIG. 5. The measurements shown were performed during one single flash of light with a lighting duration of one flash of light of approximately 10 ms. The photovoltaic element 1 evaluated in the example shown is a standard high efficiency, high-capacitance c-Si module, which is currently available on the market, e.g. SANYO Energy Corp., SunPower Corp., Yingli Green Energy Holding Co. Ltd. The power measurements were performed in a state-of-the-art commercially available Pasan pulsed simulator under standard test conditions, abbreviated as STC, and comprising the values G=1'000 W/m$^2$; T=25° C.; Spectrum AM 1.5, with a 10 ms sweep-time in forward sweep direction and 12 µs interval time. The irradiance was calibrated against a primary PTB reference device, PTB being Physikalisch-Technische Bundesanstalt, the national institute for natural and engineering sciences and the highest technical authority for metrology and physical safety engineering in Germany.

All measurements were performed in a temperature controlled dark room designed to provide light trapping of indirect illumination to a great extent. For the measurements, the electrical voltage across the photovoltaic element 1 was chosen to be independently changed, which in the experiments shown was carried out using a controlled commercial Pasan voltage source unit configured with precomputed voltage points. Accordingly, the electrical current was a dependent measured quantity. After a respective determinable time duration, in this case embodied as lapse of a minimum time duration, sampling of both respective values of electrical voltage as well as of electrical current was performed by a twelve bit seven channel commercial Pasan current-voltage measurement device as an embodiment of an ammeter and a voltmeter. It can be discerned that the electrical current displays strong hysteresis effects with the change of voltage. In the example shown, the respective times of sampling were derived quasi ex-situ by calculating the minimum time by using the respective steady-state capacitance changes both at a respective step as well as the immediately precedent step. For this, an equation similar to equation (1) as described below was used. For this, the respective changing value by which the voltage was changed between two subsequent measuring steps was chosen such that transient errors were omitted. In FIG. 2, the results of the measurements described are presented as normalised values, i.e. as normalised electrical voltage and normalised electrical current, i.e. the respective actual values are divided by the respective maximum value.

Figure 3:
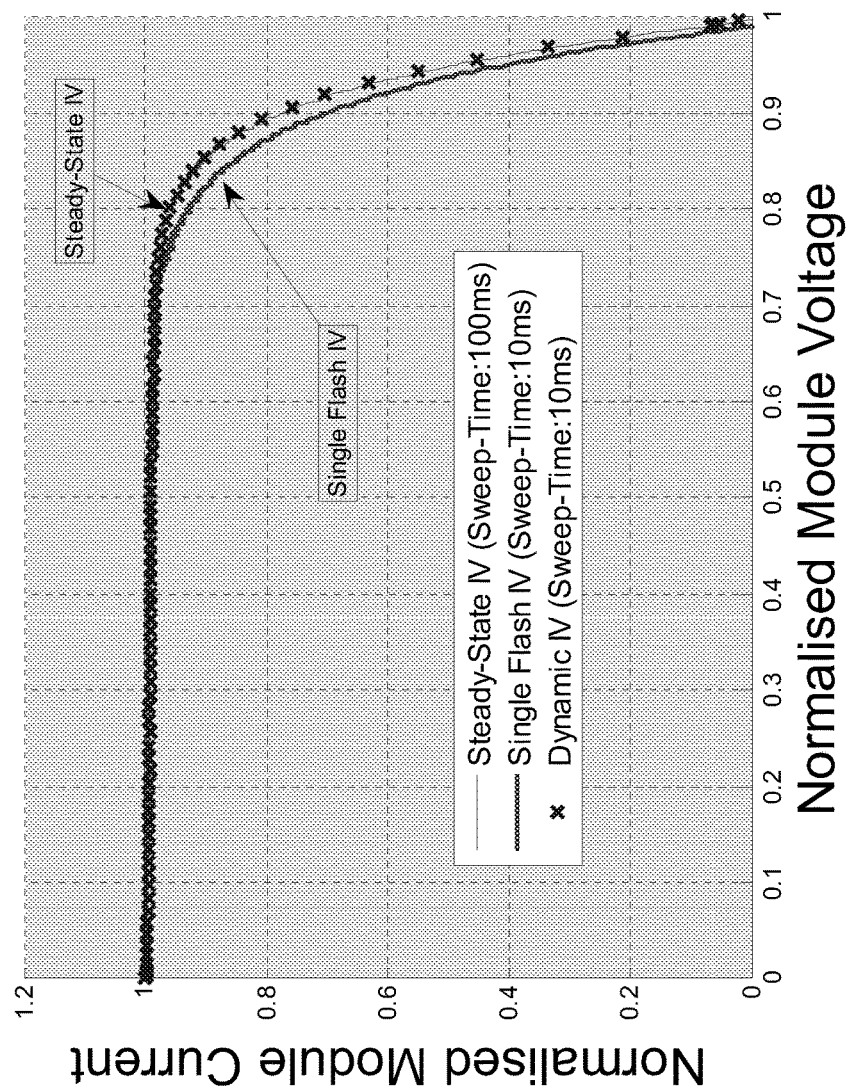
FIG. 3 is an illustration of an electrical voltage of a photovoltaic element in dependence on time.

In FIG. 3, the results of a measurement according to the measurement series described above and shown in FIG. 2, are presented. For this, the normalised electrical current is shown as a function of the normalised electrical voltage, i.e., a current-voltage characteristic of the respective photovoltaic element is shown. For comparison, the results of the dynamic current-voltage measurements as shown in FIG. 2, shown with cross data points, sampled in a single flash of light of 10 ms duration, are compared and appear identical with the steady-state current-voltage characteristic of the module, shown as a solid line and obtained from steady-state measurements. The steady-state characteristics of the module were measured using a 10 flash multi-sectional current-voltage linear sweep measurement totaling 100 ms of measurement time. Indicatively, the IV curve of the same module obtained with a conventional forward-sweep single-flash measurement of 10 ms linear sweep-time is also shown as a solid curve and exhibits oscillations and major deviations. It was shown in this example that the method can yield accurately and rapidly the steady-state characteristics of a high capacitance photovoltaic module in a single flash of light. The results shown in FIG. 3 demonstrate consequently the accuracy of the method used according to the invention.

Figure 4:
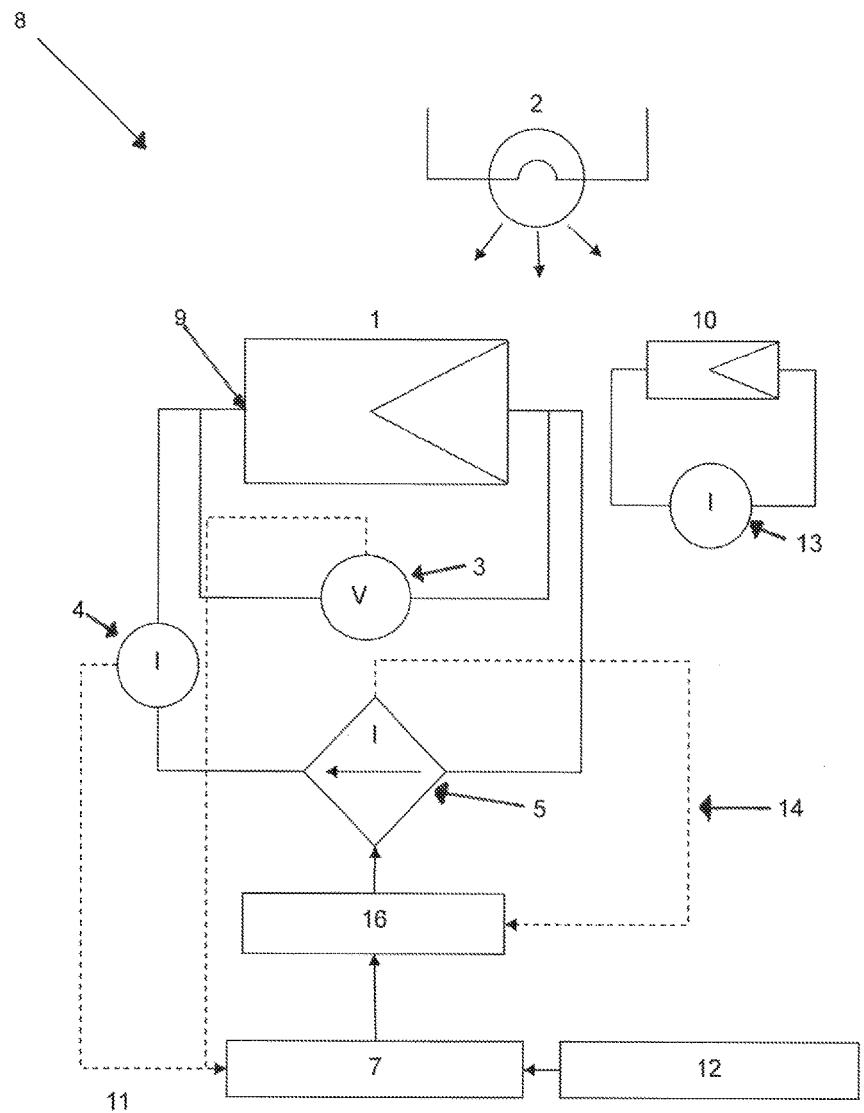
FIG. 4 is an illustration of a first measurement system configuration with an electrical current source unit and a regulation unit for regulation of said electrical current source unit.

In FIG. 4 an exemplary implementation of the photovoltaic element evaluation method is shown. The exemplary embodiment of a measurement system configuration 8 shown in FIG. 4 exhibits a photovoltaic element 1 that is connected with a voltmeter 3 and an ammeter 4 whereas the latter are connected in parallel with each other. For the connection of the photovoltaic element 1 to the measuring circuit a connecting system 9 is used. Furthermore, an electrical current source unit 5 is connected in line with the ammeter 4. An input of the electrical current source unit 5 is connected with a regulating unit 16 for regulation of said electrical current source unit 5. An input of the regulating unit 16 in this part is connected with a controlling unit 7 for controlling of said regulation unit 16. As an input for the controlling unit 7 there are both a current-voltage feedback 11 and dynamic settings 12. The regulating unit 16 is fed by a current feedback 14. Furthermore, an independent measuring circuit 10 including an ammeter 13 is shown in FIG. 4. In front of the photovoltaic element 1 the light emitting element 2 is shown.

As an example, a first operation principle as follows could be carried out as an embodiment of the invention by using, for instance, the implementation shown in FIG. 4, i.e. with electrical current being directly controlled and electrical voltage being a dependent value. Using the first operation principle, the load variations are regulated based on predetermined estimation of the voltage-dependent capacitance, $C(V)$, of the measurement system configuration:

The operation method essentially involves three phases:

(i) In the first phase the variation of the voltage-dependent relative capacitance $C(V)$ is estimated. Since the required information is not absolute, values can be approximated by a plethora of methods. In addition to the traditional methods of measuring the electrical impedance of a device, the relative variation of capacitance can be also measured by photo-current-response measurement, or simply by comparing current-voltage characteristics acquired with different sweep-times or sweep-directions. For the success of the method only an approximation of the relative capacitance change is required. Therefore, sufficient data can be also collected rapidly under dark conditions. The relative capacitance derived can then be used autonomously, or be further refined by means of capacitance modeling of solar cell or modules. Such corrective iterations can be instantly realised.

(ii) In the second phase the dynamic settings of the electronic load are calculated. The applied load mesh is computed using an appropriate equation. In the measurements shown the equation $$\frac{t(I_{i,meas}, V_{i,meas})}{T} \propto \frac{|C(I_{i,SS}, V_{i,SS}) - C(I_{i-1,SS}, V_{i-1,SS})|}{\sum_{i=1}^{N} |C(I_{i,SS}, V_{i,SS}) - C(I_{i-1,SS}, V_{i-1,SS})|} + c \quad (1)$$

was used. In this equation, $t(I_{i,meas}, V_{i,meas})$ is a value being used as minimum time duration that is preferably to be lapsed after a changing of In this equation, $(I_{i,meas}, V_{i,meas})$ is a measured pair of current-voltage for an $i^{th}$ datapoint of a current-voltage characteristics consisting of N points. $C(I_{i,SS}, V_{i,SS})$ is the relative capacitance corresponding to steady-state current-voltage conditions $(I_{i,SS}, V_{i,SS})$. $C(I_{i-1,SS}, V_{i,SS})$ is the relative capacitance corresponding to the steady-state current-voltage conditions of its previous $(i-1)^{th}$ datapoint. For the special case of $i=1$, the relative capacitance $C(I_{i-1,SS}, V_{i,SS})$ corresponds to a bias condition of the photovoltaic element. The constant, $c$, is related to a delay introduced by the load regulation. The number of points N measured within the time frame T is chosen suitably, so any pair $(I_{i,meas}, V_{i,meas})$ of the measured current-voltage of the current-voltage curve would be reproducible of its steady-state values $(I_{i,SS}, V_{i,SS})$ and shall not show significant signs of transient errors.

With the above equation, a mesh of changings of electrical currents to be applied as a function of time and the estimated voltage-dependent relative capacitance, i.e. the V(t) curve shown in FIG. 2, can be calculated.

(iii) In a third phase the controlling unit 7 can then be used to apply the computed load mesh to the photovoltaic element 1 in subsequent steps and with measuring the voltage with the voltmeter 3 after a lapse of time $t_i$.

As a further example, a second operation principle as follows could be carried out as an embodiment of the invention by using, for instance, the implementation shown in FIG. 4, i.e. with electrical current being directly controlled and electrical voltage being a dependent value.

Figure 7:
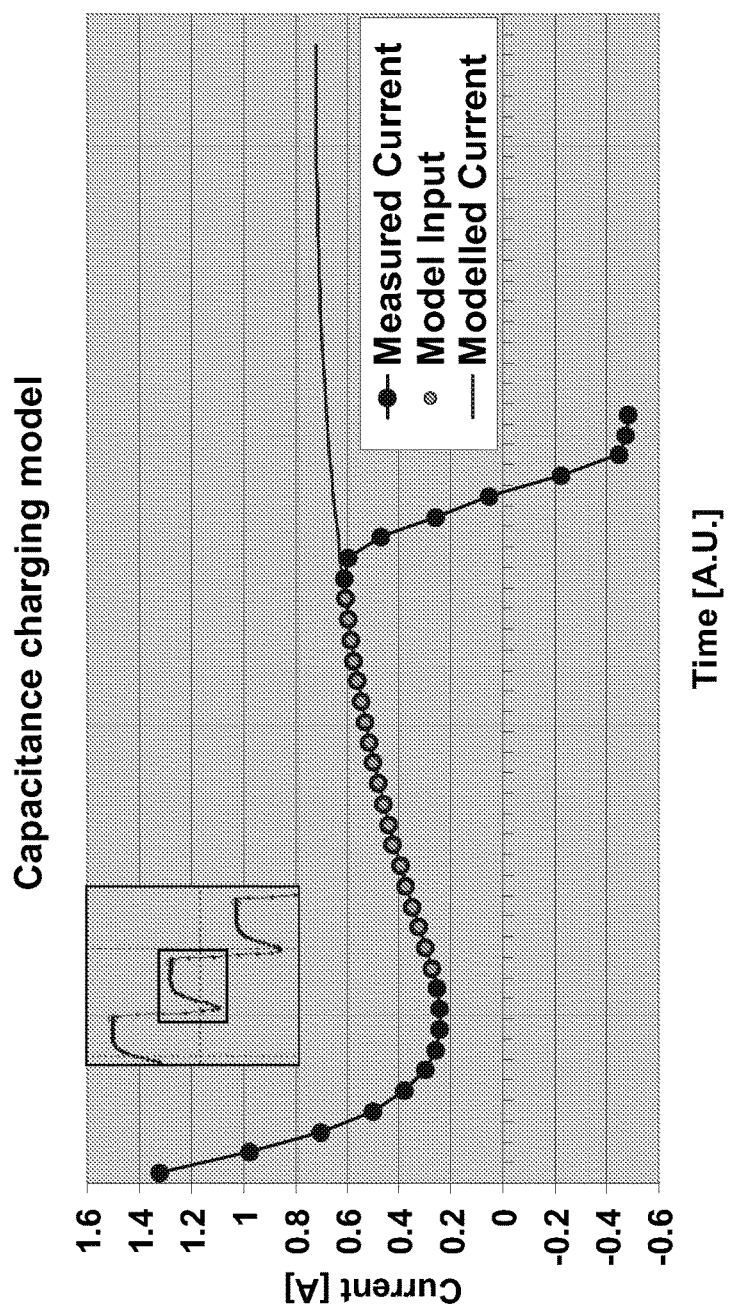
FIG. 7 is an illustration of a modelled electrical current of a photovoltaic element in dependence on time determined by a partially relaxed measured electrical current response.
Figure 8:
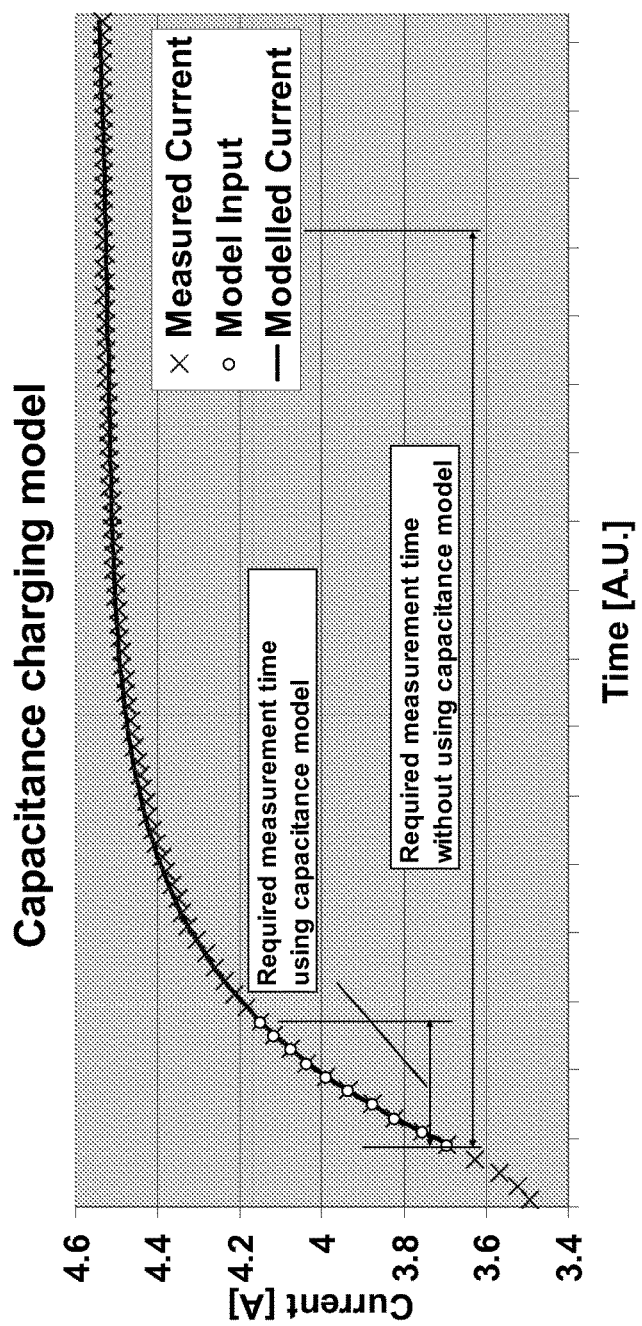
FIG. 8 is an illustration of a modelled electrical current of a photovoltaic element in dependence on time determined by a partially relaxed measured current response against a measured electrical current which response has fully relaxed.

The second method uses real-time feedback to trigger the sampling of the current-voltage data. It involves two phases:

(i) In a first phase a regulation algorithm initiates applying a load to the photovoltaic element 1, maintaining it constant until the conditions $dI/dt \rightarrow 0$ and $dV/dt \rightarrow 0$ are simultaneously satisfied, where $dI/dt$ designates the time derivative of the electrical current measured, and $dV/dt$ designates the time derivative of the electrical voltage measured. In order to increase the number of measured IV data points, an alternative method can also be implemented. The method allows measurements to be performed while $dI/dt$ has not fully stabilised. Such a method computes the stabilised current from partially stabilised data using capacitance based fitting algorithm as shown in FIG. 7. The method can be applied either on real-time basis or after the measurement has been performed. FIG. 8 shows the time optimisation, which can be achieved using a capacitance charging model. The graph compares the modeled data, which were computed based on a capacitance model, versus the actual measured values. It is shown that the dynamic behavior of the device can be predicted successfully and the time management can be further optimised. Nevertheless, both methods, which allow full and partial relaxing of the device response can be used heterogeneously on the same measurement to improve the reliability of the method. In both FIG. 7 and FIG. 8 the time is depicted in arbitrary units, abbreviated a.u.

(ii) When conditions are satisfied, the second phase begins. The current and voltage measurements are sampled and the regulation algorithm applies a new load to the test device. The procedure repeats till full current-voltage tracking has been achieved, i. e. a time-dependent current-voltage characteristic can be composed from the data obtained. From a theoretical point of view, i.e. equivalent circuit simulation, this method shows optimised results as it can optimise in-situ the number of points and the necessary duration of each applied load. In this case, current-voltage-irradiance oscillations have to be considered to trigger a change on the applied load and refine the final results. Although, the method can be applied independently, it may also work well in conjunction with the first algorithm method to optimise the duration of the load signal and the applied load interval between measurement points. The point density can be increased in particular regions of interest by performing prior dark IV measurement using slow current or voltage sweep of typically 50 ms to 1 sec, which is then computed on time during the measurement under light to locate the targeted regions. Furthermore, an MPP and $V_{OC}$ dynamic tracking algorithm can be used on time to precisely determine their respective or surrounding IV characteristics.

Furthermore, a combination of one or both of the two methods presented with other methods and/or with supplementary algorithms can be intended.

For example, one or both of said two methods described may also be used to improve the time-efficiency of multi-flash measurements. In this case, the time frame, T, is the total measurement time of the flashes employed.

The two suggested measurement methods detailed above may also be used in combination with algorithms, which increase the current-voltage datapoint density in regions of interest, e. g. relative to the performance parameters $I_{SC}$, MPP, $V_{OC}$. The application of such methods would allow for estimating performance parameters with greater accuracy, but also to achieve full current-voltage tracking within a single flash of light. An example would be the implementation of an algorithm which weights the point density by a factor relative to 1/(dP/dV), while using equation (1) to determine the number of sampled points, N, and their duration.

Figure 5:
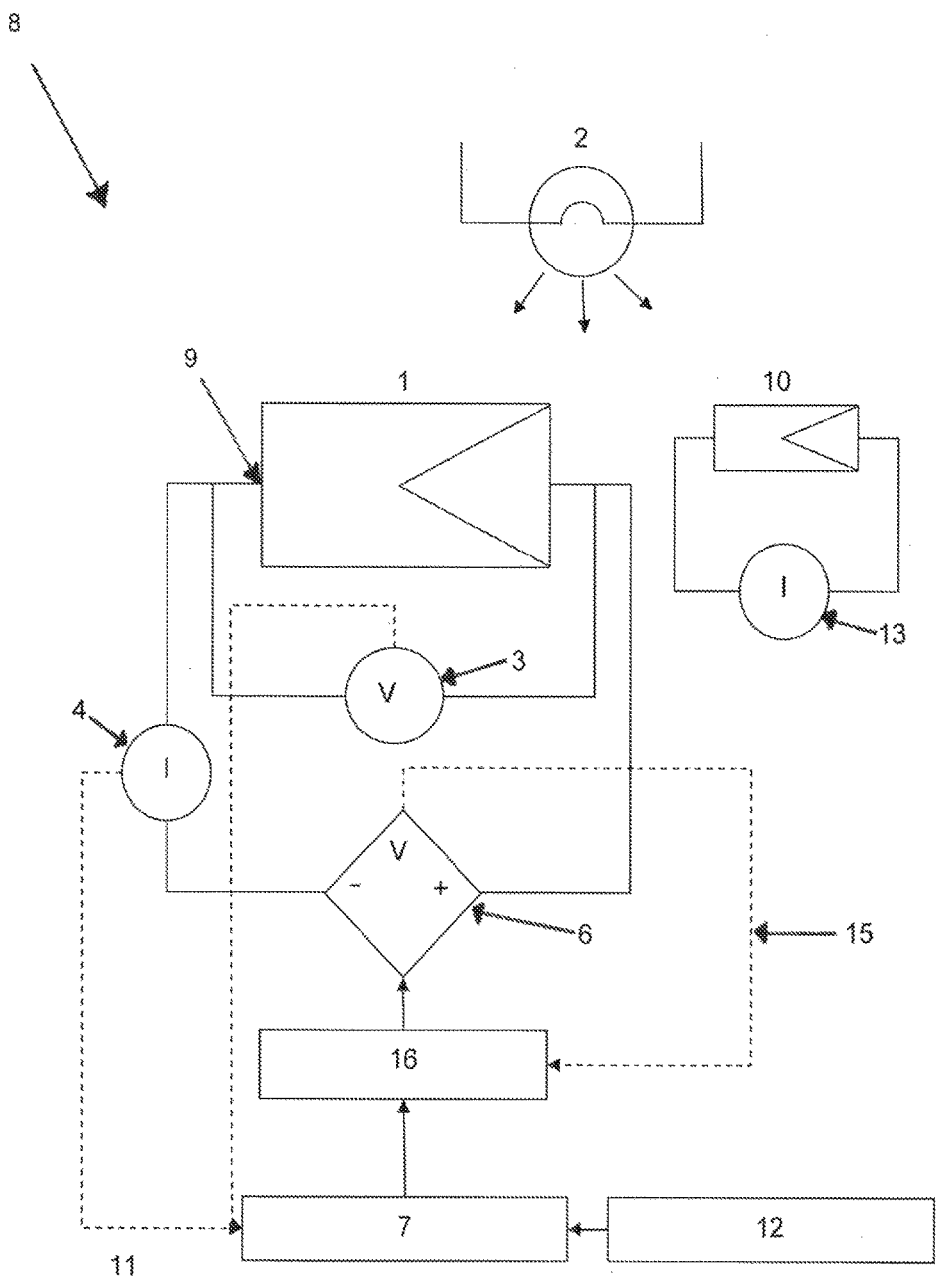
FIG. 5 is an illustration of a second measurement system configuration with an electrical voltage source unit and a regulation unit for regulation of said electrical voltage source unit.

In FIG. 5 an exemplary implementation of the photovoltaic element evaluation method is shown. The exemplary embodiment of a first measurement system configuration shown in FIG. 5 exhibits a photovoltaic element 1 that is connected with a voltmeter 3 and an ammeter 4 whereas the latter are connected in parallel with each other. Furthermore, an electrical voltage source unit 6 is connected in line with the ammeter 4. An input of the electrical voltage source unit 6 is connected with a regulating unit 16 for regulation of said electrical voltage source unit 6. An input of the regulating unit 16 in his part is connected with a controlling unit 7 for controlling of said regulation unit 16. As an input for the controlling unit 7 there are both a current-voltage feedback 11 and dynamic settings 12. The regulating unit 16 is fed by a voltage feedback 15. The further features of the embodiment shown in FIG. 5 are similar to those shown in FIG. 4.

Figure 6:
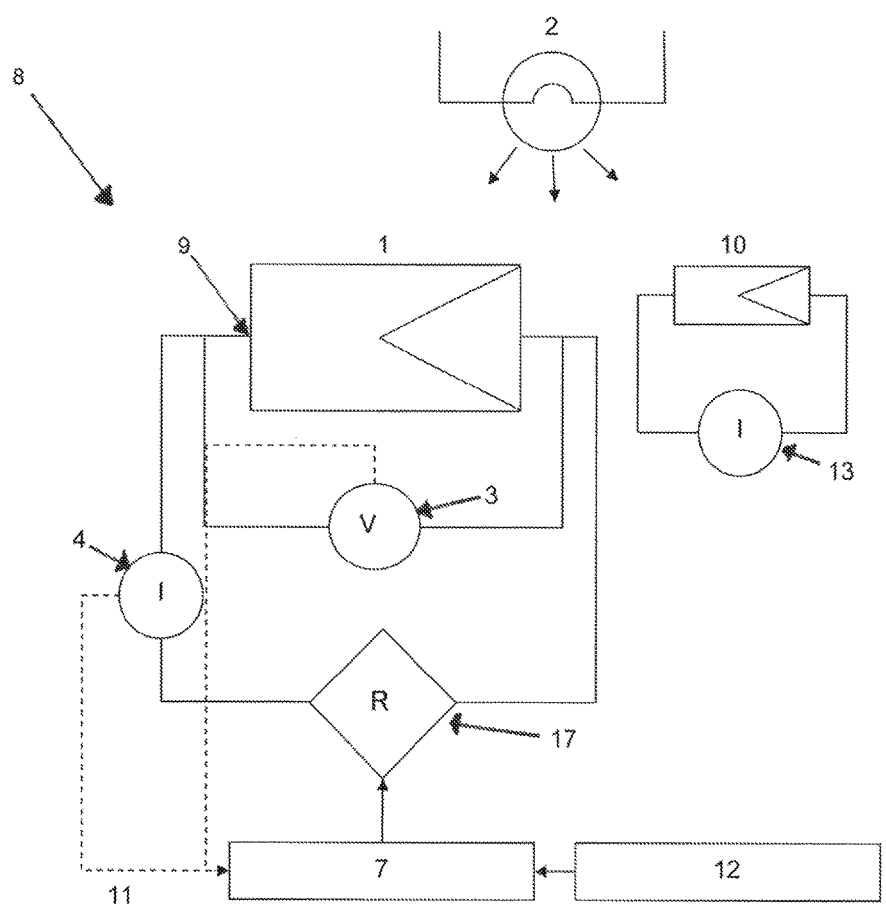
FIG. 6 is an illustration of a further measurement system configuration with an impedance load.

In FIG. 6 an exemplary implementation of the photovoltaic element 1 evaluation method is shown. The exemplary embodiment of a second measurement system configuration 8 shown in FIG. 6 exhibits a photovoltaic element 1 that is connected with a voltmeter 3 and an ammeter 4 whereas the latter are connected in parallel with each other. Furthermore, a controllable impedance load unit 17 is connected in line with the ammeter 4. An input of the regulating unit 16 in this part is connected with a controlling unit 7 for controlling of said controllable impedance load unit 17. As an input for the controlling unit 7 there are both a current-voltage feedback 11 and dynamic settings 12. The further features of the embodiment shown in FIG. 6 are similar to those shown in FIG. 4.

The advantage of the invention described is that a photovoltaic element evaluation method as well as appropriate facilities are provided, that allow for accurate measurement of current-voltage-characteristics of photovoltaic elements, as particularly high-capacitance solar cells or modules, in a single flash of light lasting down to only a few milliseconds, typically around 5 to 10 ms. This goal is accomplished in a way that ensures that the response time of the test specimen and the rate of data collection does not introduce errors, where it is referred to IEC 60904-1 2006. It was shown that the resulting current-voltage characteristics closely correspond to constant voltage, constant current and constant light conditions. Consequently, a steady-state current-voltage curve of the respective same test specimen was shown to be well-reproduced.

Photovoltaic element capacitance is known to generally increase almost exponentially with applied voltage. Thus, the time required to measure a current-voltage data point, independently and free of capacitive artifacts, would also increase almost exponentially. The innovation of the described method is that it maintains constant the irradiance level together with the load source unit, voltage and/or current, for a duration proportional to the capacitance of the device, while dynamically recording the measured quantities, current and/or voltage, until the photovoltaic element stabilises to its practically capacitance-free response. Hence, the described technique realises an efficient management of the measurement time, and achieves full current-voltage tracking from short-circuit, abbreviated as $I_{SC}$, to open-circuit, abbreviated as $V_{OC}$, conditions within a single flash of light.

The novelty of the invention described is that it introduces the time as an independent variable in current-voltage measurements. For this reason the method can also be referred to as dynamic current-voltage measurement or as dynamic current-voltage measurement or as dynamic IV measurement. The measured data are time-dependent voltage, V(t), and time-dependent electrical current, I(t), curves, whose response varies with both the change of the applied load and the hysteresis caused by capacitance of photovoltaic elements. The electric charge stored at the photovoltaic element would decay almost exponentially with time under constant applied load. Consequently, the dependent measured quantity, which is recorded dynamically, would also exhibit a decaying behavior. Alternatively a similar measurement strategy can be also realised by controlling the time-dependent electrical current, I(t), and monitoring the time-dependent voltage, V(t). Likewise, the voltage would exhibit a time decay until it stabilises to its final value. Although, theoretically the load signal has a minimum duration to ensure that transient errors do not affect the sampled measurement, the user still receives self-sufficient feedback for the accuracy of the measurement by observing the measured V(t) and I(t) characteristics.

The application of the invention offers significant advantages to measurement, testing and/or classification of photovoltaic elements, and in particular of high-efficiency, high capacitance crystalline photovoltaic elements. In particular, the invention provides a basis for cost-effective, rapid and accurate power measurements in research and development, industry and certification in a single-flash of light. The suggested photovoltaic element evaluation method may be alternatively used to improve the efficiency of multi-flash current-voltage measurements.

The invention claimed is:

1. A method of evaluation a photovoltaic element including a time-controlled measurement of a current-voltage characteristic of a photovoltaic element, said photovoltaic element being arranged in a measuring circuit for measuring at least an electrical current and/or an electrical voltage of said current-voltage characteristic, the method comprising:
    disposing said photovoltaic element to at least one short flash of light having a discrete lighting duration, said short flash of light being generated by a pulsable light emitting element; and
    performing a number of measuring steps during said lighting duration;
    wherein each of said measuring steps includes
        changing step-wise at least one characteristic value of said electrical current, said electrical voltage, and an impedance load,
        sampling of at least one responsive value related to at least one of the other of said electrical current, said electrical voltage, and said impedance load,
        determining a time derivative of the at least one responsive value of said electrical current or said electrical voltage, and
        checking for matching of said time derivative of said electrical current or said electrical voltage at a certain point in time with a setpoint value,
        wherein a determinable time duration is set, the determinable time duration includes a reaction time for increasing or decreasing during each of said measuring steps.

2. The method according to claim 1, which additionally comprises:
    sampling both of said electrical current and said electrical voltage at least nearby an end of said determinable time duration,
    beginning of a next measuring step at least shortly after said sampling of both said electrical current and said electrical voltage unless an intended maximum value of at least one of said electrical current and said electrical voltage is reached.

3. The method according to claim 1 further comprising: adjusting said determinable time duration dependent on a condition of a steady-state value of said at least one responsive value.

4. The method according to claim 1, wherein determining said determinable time duration in dependence on a saturation behaviour of said photovoltaic element, considered as a model of a capacitive element, is carried out.

5. The method according to claim 1 further comprising: determining said determinable time duration by using a capacitance charging model, wherein extrapolating a time-dependent change of at least one of said electrical current and electrical voltage by fitting said capacitance charging model is generated.

6. The method according to claim 1 further comprising: determining said determinable time duration by using a respective relative capacitance change, between a current measuring step and a preceding measuring step.

7. The method according to claim 1 further comprising: determining said determinable time duration, by using $$\frac{t(I_{i,meas}, V_{i,meas})}{T} \propto \frac{|C(I_{i,SS}, V_{i,SS}) - C(I_{i-1,SS}, V_{i-1,SS})|}{\sum_{i=1}^{N} |C(I_{i,SS}, V_{i,SS}) - C(I_{i-1,SS}, V_{i-1,SS})|} + c$$

wherein,
    $t(I_{i,meas}, V_{i,meas})$=determinable time duration;
    C=capacitance;
    $Ii_{,ss}$=steady state current;
    $V_{i,ss}$=steady state voltage;
    $(I_{i,meas}, V_{i,meas})$=measured pair of current-voltage for an $i^{th}$ datapoint of a current-voltage characteristics consisting of N points; and
    c=constant related to a delay.

8. The method according to claim 1 further comprising: adjusting the characteristic value of said changing of at least one of said electrical current, said electrical voltage, and said impedance load by using an estimated dependence of a time duration, on said at least one of said electrical current, said electrical voltage, and said impedance load.

9. The method according to claim 1 further comprising: carrying out said changing of at least one of said electrical current, said electrical voltage, and said impedance load in equidistant steps of values of said changing during at least a part of said measurement.

10. The method according to claim 1 further comprising: carrying out said number of measuring steps-at least partially, within one single of said short flash.

11. A measurement system for performing time-controlled measurements of current-voltage characteristics of replaceable photovoltaic elements comprising:
    a pulsable light emitting element,
    a connecting system for connecting a photovoltaic element to a measuring circuit of said measurement system configuration, said measuring circuit includes a voltmeter and an ammeter being connected in parallel with each other and with said connecting system,
    at least one of
        an electrical current source unit for controlling an electrical current, being connected with said ammeter,
        an electrical voltage source unit for controlling an electrical voltage, being connected with said voltmeter, and
        a controllable impedance load unit for controlling an impedance load being connected with at least one of said ammeter and said voltmeter,
    a controlling unit for controlling at least one of said electrical current source unit, said electrical voltage source unit, and said controllable impedance load unit, whereby during said measurements said controlling unit is able to at least initiate a step-wise changing of at least one of said electrical current, said electrical voltage, and said impedance load,
    wherein said controlling unit includes an initiator for said changing of at least one of said electrical current, said electrical voltage, and said impedance load in case that at least matching of at least one of a time derivative of said electrical current and said electrical voltage at a certain point in time with respective setpoint values is determined by the controlling unit.

12. The measurement system according to claim 11, wherein said controlling unit includes an initiator for said changing of at least one of said electrical current, said electrical voltage, and said impedance load in case that a steady-state value of said at least one of said electrical current and said electrical voltage is achieved.

13. The measurement system according to claim 11 wherein said controlling unit includes an initiator for said changing of at least one of said electrical current, said electrical voltage, and said impedance load at times and by values of said step-wise changing determined by using respective relative capacitance changes between respective two subsequent measuring steps.

14. The measurement system according to claim 11 wherein, said controlling unit is connected with a processing unit, said processing unit calculating at least one of times and values of said step-wise changing by using values measured by at least one of said voltmeter and said ammeter.

15. The measurement system according to claim 11 wherein, said controlling unit is connected with a memory unit being filled with predetermined values of at least one of times and values of said step-wise changing.

16. The measurement system according to claim 11 wherein, said measurement system configuration includes an independent measuring circuit for carrying out reference measurements, said independent measuring circuit includes
   a photovoltaic reference element being disposed in a comparable arrangement with said pulsable light emitting element as the photovoltaic element,
   at least one of a further ammeter and a further voltmeter.

17. The measurement system according to claim 11 wherein said connecting system is designed for connection of standardised photovoltaic elements for performing a high throughput photovoltaic element evaluation.

* * * * *